US006832381B1

(12) United States Patent
Mathur et al.

(10) Patent No.: US 6,832,381 B1
(45) Date of Patent: Dec. 14, 2004

(54) APPLICATION PROGRAM INTERFACES AND STRUCTURES IN A RESOURCE LIMITED OPERATING SYSTEM

(75) Inventors: Sharad Mathur, Redmond, WA (US); Gregory Hullender, Kirkland, WA (US); Mark Miller, Kirkland, WA (US); Bruce Johnson, Woodinville, WA (US); Michael Ginsberg, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/560,546

(22) Filed: Apr. 28, 2000

Related U.S. Application Data

(62) Division of application No. 09/273,592, filed on Mar. 22, 1999.
(60) Provisional application No. 60/078,946, filed on Mar. 23, 1998.

(51) Int. Cl.⁷ ............................................. G06F 9/54
(52) U.S. Cl. ........................................ 719/328; 711/170
(58) Field of Search ................................. 709/104, 328, 709/226–229; 718/104; 711/170, 154, 100; 719/328

(56) References Cited

U.S. PATENT DOCUMENTS

| | | | | |
|---|---|---|---|---|
| 5,274,819 A | * | 12/1993 | Blomfield-Brown | ........ 709/100 |
| 5,724,506 A | | 3/1998 | Cleron et al. | .......... 395/200.01 |
| 5,809,554 A | * | 9/1998 | Benayon et al. | ............ 711/171 |
| 5,813,042 A | * | 9/1998 | Campbell et al. | ............ 711/159 |
| 6,023,712 A | * | 2/2000 | Spear et al. | ................ 707/205 |
| 6,128,713 A | * | 10/2000 | Eisler et al. | ................ 711/159 |
| 6,134,602 A | * | 10/2000 | Engstrom et al. | ........... 709/328 |
| 6,253,215 B1 | * | 6/2001 | Agesen et al. | .............. 707/206 |
| 6,256,645 B1 | * | 7/2001 | Mundy | ........................ 707/205 |
| 6,408,313 B1 | * | 6/2002 | Campbell et al. | ........... 707/205 |
| 6,430,564 B1 | * | 8/2002 | Judge et al. | ................ 707/100 |
| 6,671,745 B1 | * | 12/2003 | Mathur et al. | .............. 719/328 |

OTHER PUBLICATIONS

IBM Technical Disclosure Bulletin. "Memory Manager for Application Programs in OS/2". May 1, 1992.*
Ford, Bryan et al. "Microkernels Meet Recursive Virtual Machines." May 10, 1996.*
Pellerin, David. "The Microsoft Win32 Programming Model: A Primer for Embedded Software Developers." Sep. 1997.*
Gottenmukkala, Vibby et al. "Locking and Latching in a Memory–Resident Database System." Proceedings of the 18th Conference Vancouver, British Columbia, Canada 1992.*
Abrossimov, Vadim et al. "Generic Virtual Memory Management for Operating System Kernels." ACM. 1989.*
Bershad, B.N., et al., "Extensibility, Safety and Performance in the SPIN Operating system", *SIGOPS '95*, pp. 267–284, (1995).
Levy, M., "Windows CE, At The Center Of A Juggling Act", *Electrical Design News, 42(15)*, pp. 38–50, (Jul. 1997).
Mendelsohn, N., "Operating systems for component software environments", *IEEE*, 49–54, (1997).

* cited by examiner

*Primary Examiner*—Lewis A. Bullock, Jr.
(74) *Attorney, Agent, or Firm*—Workman Nydegger

(57) ABSTRACT

A set of Application Program Interfaces (APIs) for a resource-limited environment are disclosed. The APIs provide a mechanism for a computer application to interface with various components and modules of an operating system for a resource-limited environment. The APIs further provide a mechanism to interface with input/output devices commonly found in embedded systems running in a resource-limited environment.

20 Claims, 3 Drawing Sheets

APPLICATION PROGRAM INTERFACES AND STRUCTURES IN A RESOURCE LIMITED OPERATING SYSTEM

RELATED FILES

This application is a divisional of U.S. application Ser. No. 09/273,592 filed Mar. 22, 1999, which claims the benefit of U.S. Provisional Application No. 60/078,946, filed Mar. 23, 1998, which is hereby incorporated herein by reference.

FIELD OF THE INVENTION

This invention relates generally to computer operating systems, and more particularly to application program interfaces for resource limited operating systems.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright ©1998, 1999, Microsoft Corporation, All Rights Reserved.

BACKGROUND OF THE INVENTION

The rapid evolution of personal computer technology continues to produce personal computers (PCs) that are smaller, cheaper and faster than their predecessors. Where computers once occupied entire rooms, they are now small enough to fit in the palm of a user's hand, hence the name "Palm-size PCs". In addition, PCs are now small enough to be placed in environments outside of the home or office, such as an automobile. Further more, the new PCs may be embedded in a variety of consumer devices and specialized industrial controllers. For the purposes of this application, all of the above-referenced PCs will be referred to collectively as "embedded systems."

The reduced size of embedded systems means that certain sacrifices need to be made. For example, a typical embedded system does not have fixed or removable disk drives such as hard disk, floppy disk, CD-ROM or DVD-ROM drives, with the persistent storage of a typical embedded system comprising flash memory or volatile memory with a battery refresh. In addition, the amount of RAM in the typical embedded system is also limited.

In addition, output resources typical to a desktop PC may be missing or severely limited in an embedded system. For example, the display for a typical embedded system may comprise a small LCD screen with limited resolution and capable of displaying only grayscale or a limited number of colors. In certain environments, such as the automobile, the: display may be an LCD screen with a limited number of fixed icons and text areas. The display may be augmented with a computerized speech facility. Similarly, Similarly, input resources may be limited or adapted for use in embedded systems. For example, many embedded systems do not have a mouse or other pointing device. In addition, some hand-held devices do not have a physical keyboard. Such embedded devices may use a touch sensitive display in conjunction with a virtual keyboard placed on the display. In addition, embedded devices may employ speech recognition for input.

As a result of the above, specialized operating systems capable of running in the resource-limited environment of the embedded system have been developed. An example of such an operating system is the Windows CE™ operating system from Microsoft Corporation.

Applications running on the embedded system must also be capable of running in the resource limited environment described above. In embedded systems comprising Palm-size PCs, these applications are typically specialized versions of applications available on the bigger siblings of the Palm-size PC, such as calendar programs, personal information managers, calculators, dictionaries and the like.

In other environments, the applications running on the embedded system may be more specialized. For example, in an AutoPC, the applications may comprise applications that interface with an audio system, applications that report and use position and navigation information, and applications that monitor the condition and state of various other systems present in the automobile.

In order to accommodate a large number of different application needs, operating systems typically provide APIs (Application Programming Interfaces) to a wide variety of functionality that is common to many differing applications. Any one application generally uses only a small subset of the available APIs. Providing a wide variety of APIs frees application developers from having to write code that would have to be potentially duplicated in each application. However, in the resource limited environment of the embedded system, there is typically a much more limited set of APIs available. This is because there is generally insufficient persistent and non-persistent memory available to support a large number of different APIs. Thus, a developer writing an application for an embedded system may find that he or she must develop code that would ordinarily be provided by the operating system in a desktop's or other larger computer's operating system.

As a result of the above, there is a need in the art for an operating system capable of running in the resource limited environment of an embedded system. Such an operating system should be customizable and adaptable to the wide variety environments that system designers may choose to place embedded systems, allowing developers to include only those components and modules that are necessary for a particular environment. In addition, the operating system should include APIs to operating system provided components and modules in order prevent applications designers from having to duplicate commonly needed code. Finally, the operating system should provide APIs for components and modules that meet the unique input and output needs of an embedded system.

SUMMARY OF THE INVENTION

The above-mentioned shortcomings, disadvantages and problems are addressed by the present invention, which will be understood by reading and studying the following specification.

A system is presented that includes a set of Application Program Interfaces (APIs) for a number of software modules and components for resource limited environments. One example of a resource limited environment is the embedded system, which comprises a variety of consumer devices and specialized industrial controllers, along with hand-held, or palm-size personal computers.

One aspect of the system is that the combination of components and modules included in an operating system for resource limited environments is customizable and flexible. This allows an embedded system designer to include only those components and modules that are necessary for a particular environment. As a result, scarce memory is not consumed by unneeded components, allowing more memory to be devoted to applications and other modules and components that are needed in the embedded system.

Another aspect of the system is that APIs are provided that meet the unique input and output needs of the typical embedded system. For example, many embedded systems do not provided a keyboard or mouse for input. The system provides APIs to components and modules that provide alternative mechanisms of providing input. These alternative mechanisms include APIs to handwriting recognition engines that "read" strokes on a touch sensitive screen, and APIs to voice input components that allow a user to issue spoken commands to the system. Further, the system provides APIs to components that output audible speech for those environments where a display monitor is impractical.

Another aspect of the system is that the handling of "out of memory" conditions is customizable by an embedded system designer. This is important to systems with limited resources, because out of memory conditions are more likely to occur.

A further aspect of the system is that an API to a position and navigation component is provided. This is useful for embedded system environments that are mobile, such as automobiles, trucks, and boats.

The APIs summarized above, and various other APIs, will be described in detail in the next section and in the attached appendices.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION OF THE INVENTION

In the following detailed description of exemplary embodiments of the invention, reference is made to the accompanying drawings and appendices that form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into four sections. In the first section, the hardware and the operating environment in conjunction with which embodiments of the invention may be practiced are described. In the second section, a system level overview of the invention is presented. In the third section, various APIs are presented allowing applications to interface with various modules and components of an operating system. Finally, in the fourth section, a conclusion of the detailed description is provided.

Hardware and Operating Environment

Figure 1:
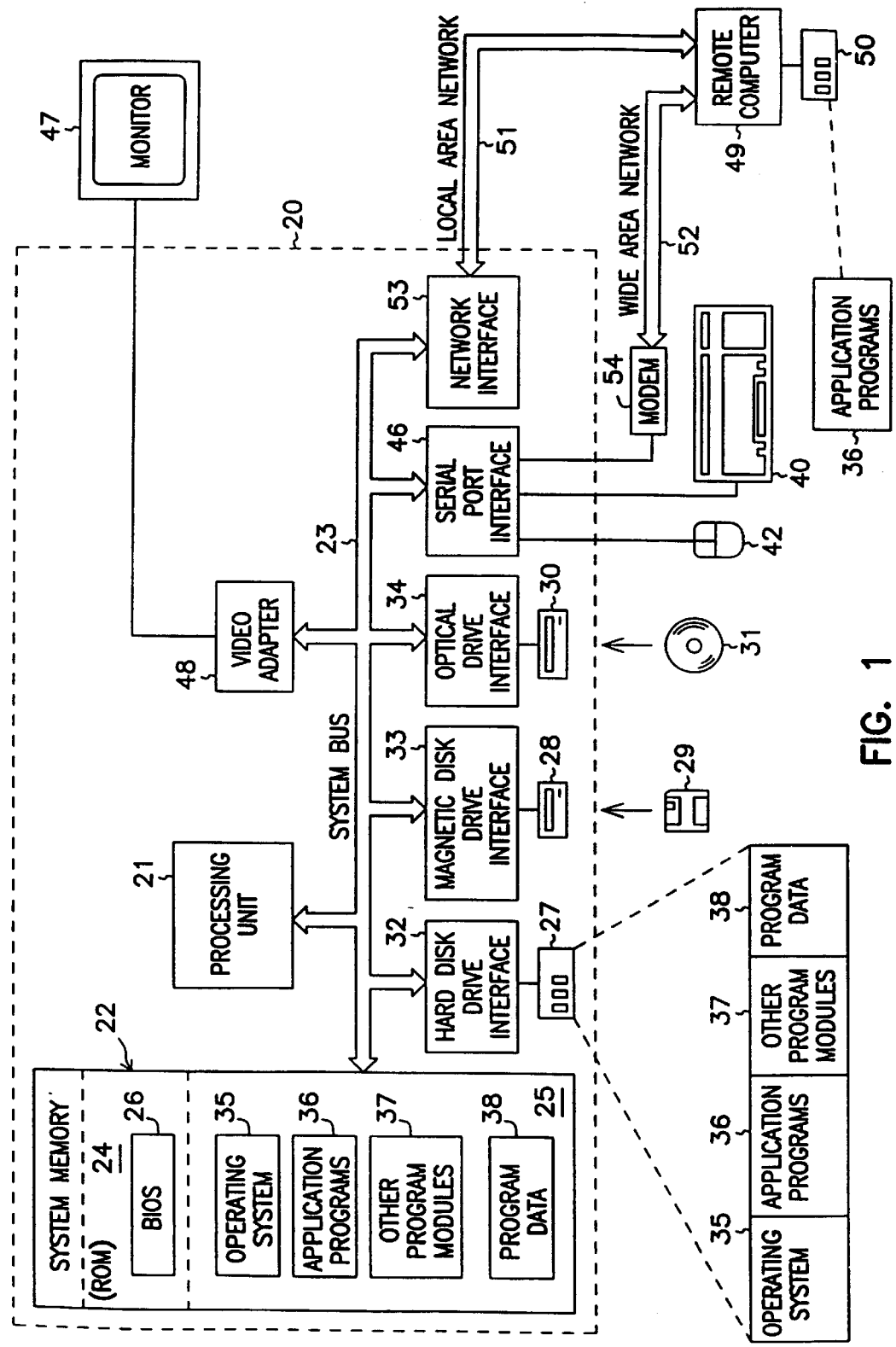
FIG. 1 shows a diagram of the hardware and operating environment in conjunction with which embodiments of the invention may be practiced.

FIG. 1 is a diagram of the hardware and operating environment in conjunction with which embodiments of the invention may be practiced. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer, a hand-held or palm-size computer, or an embedded system such as a computer in a consumer device or specialized industrial controller. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. In one embodiment of the invention, the computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. In alternative embodiments of the invention, the functionality provided by the hard disk drive 27, magnetic disk 29 and optical disk drive 30 is emulated using volatile or non-volatile RAM in order to conserve power and reduce the size of the system. In these alternative embodiments, the RAM may be fixed in the computer system, or it may be a removable RAM device, such as a Compact Flash memory card.

In an embodiment of the invention, the hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, touch sensitive pad, or the like. These and other input devices are often connected to the processing unit 21 through a serial port interface 46 that is coupled to the system bus, but may be connected by other interfaces, such as a parallel port, game port, or a universal serial bus (USB). In addition, input to the system may be provided by a microphone to receive audio input.

A monitor 47 or other type of display device is also connected to the system bus 23 via an interface, such as a video adapter 48. In one embodiment of the invention, the monitor comprises a Liquid Crystal Display (LCD). In addition to the monitor, computers typically include other peripheral output devices (not shown), such as speakers and printers.

The computer 20 may operate in a networked environment using logical connections to one or more remote computers, such as a remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer an hand-held or palm-size computer, a computer in an embedded system, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System Level Overview

A system level overview of the operation of an exemplary embodiment of the invention is described by reference to FIGS. 2 and 3. The concepts of the invention are described as operating in a multiprocessing, multithreaded operating environment on a computer, such as computer 20 in FIG. 1. The exemplary operating environment comprises what is known in the art as an operating system. In this environment one or more applications, such application 226, interface with various modules and components of the operating system. In addition, the various modules and components of the operating system interface with each other. Finally, the modules, components and applications interface with hardware 202 present on the computer through what is known in the art as a device driver module, and through an Original Equipment Manufacturer (OEM) adaptation layer 208. In one embodiment of the invention, there are two types of device drivers, built-in drivers 206 and installable drivers 204. The various modules will now be described in further detail.

The core system interface 220 is the module through which applications can access the operating system. The core system interface 220 includes functions to transfer API calls to the appropriate operating system server process.

In addition to including or exporting the APIs selected, the core system interface 220 includes components to support the following:

Localization

Local heap and memory allocation

Serial port device driver thunks

Telephony API (TAPI)

The shell module 222 manages the user interface and handles such tasks as launching software applications. In one embodiment of the invention, the operating system provides shell components that enable an embedded system designer to develop a customized shell 222 that satisfies the requirements of the target platform. Included in these components are:

A Control Panel with applets familiar to desktop Windows users. The following applets are included: Communications; Display; Keyboard; Network; Owner; Password; Power; Regional Settings, Remove Programs; Pointing Device Settings (Stylus); Sounds and Volume.

A Notification API that lets an application register its name and an event with the system. When the event occurs, the kernel will automatically start the named application. The API also allows an application to register a specific date and time at which the application should start.

Common controls and common dialogs, which are designed to provide to the user clear, simple, and meaningful information and a means to furnish input to the system and applications as needed.

A command line processor (that is, a console application) that supports a set of standard input and output API calls.

Connectivity components (for example, to support remote application programming calls) between the development workstation and the embedded system target platform.

In conjunction with a desktop, the shell module 222 also includes a desktop and task manager component that can be optionally included or replaced. The task manager component includes the following basic functionality:

An Active Tasks list of all the currently running, top-level applications;

A Run button that allows a user to launch a software application;

A Switch To button that allows a user to switch to an application selected in the Active Tasks listbox.

An End Task button that allows a user to terminate an application selected in the Active Tasks listbox.

A Cancel button that allows a user to close the Task-Manager window.

Monitors the level of main battery and backup battery power (for battery-operated target platforms) and displays an appropriate warning dialog box.

Monitors system memory usage in the system and sends a message to all top-level windows when the available system memory drops below a specific threshold. This allows applications to respond to the message by reducing their memory usage as much as possible.

The Add-on Technologies module 224 allows an embedded system developer to optionally include components such as OLE/COM automation that supports development of ActiveX-based applications, an active desktop shell and an Internet browser. Other components that can be included are Visual Basic run-time and Java script, and a subset of the Microsoft Foundation Classes (MFC). A further optional component that can be provided is a handwriting recognition engine with associated APIs. In one embodiment of the invention, handwriting applications interface with a touch sensitive input device through a component providing a software interface to the touch sensitive device.

The kernel module 214 represents the base operating system functionality that must be present on all platforms. The kernel module includes memory management, process management, exception handling, and support for multitasking and multithreading.

In one embodiment of the invention, the kernel 214 is designed specifically for small, fast, embedded devices. In this embodiment, the kernel supports a single 4 GB address space (a 2 GB virtual address and a 2 GB physical address range). In an embodiment of the invention, this 4 GB address space is divided into 33 "slots", each of which has a size of 32 MB. The kernel protects each process by assigning each process to a unique, open slot in memory. The invention, however, is not limited to any particular physical or virtual address space or slot size, and other sizes may be chosen as those of skill in the art will recognize.

The kernel 214 protects applications from accessing memory outside of their allocated slot by generating an exception. Applications can check for and handle such exceptions by using the try and except Windows CE functions. In one embodiment of the invention, the system is limited to 32 processes, but the number of threads running in a process is limited only by the amount of available memory. Those of skill in the art will appreciate that other values for the maximum number of processes could be chosen.

The file system module 218 contains the functions that support persistent storage on the embedded system target platform. This storage is referred to as the "object store" and includes three different ways to store user data:

The file system. The file system typically supports common file manipulation functions, such as functions to create files and directories, read and write to files, and retrieve file and directory information.

The registry. The system registry is similar to the registries of the Windows 95 and Windows NT operating systems. The registry for all applications, including the applications bundled in ROM, is stored in the object store.

The Database API. The operating system, in one embodiment of the invention, has its own structured storage to offer an alternative to exposing user and application data in files or the registry. For example, a database is useful for storing raw data that an application will process before displaying to the end-user. Hand-held PC applications typically store schedule and contact information in databases.

In one embodiment of the invention, the file system managed by file system module 218 is a transactioned system to reduce the possibility that data will be lost due to a critical failure, such as loss of power. Additionally, in one embodiment of the invention, the file system module 218 implements a scheme (transactioned) of "mirroring" to mirror or track file system operations (not transactioned). The purpose for this implementation is to be able to restore a file system volume in the case that power is lost during a critical sequence of operations being performed on the volume.

In one embodiment of the invention, the operating environment combines the Win32 User and GDI (Graphics Device Interface) libraries into a GWES (Graphics, Windowing, and Events Subsystem) module 212. The event manager and window manager are analogous to Win32 User, and the Win32 GDI is replaced with a smaller GDI more suitable to embedded systems. The GWES module 212 includes multiplatform GDI components (supporting an associated display driver) that support color and grayscale display, palette management, TrueType fonts, Raster fonts, cursors, and printer device contexts (DCs).

The GWES module 212 also supports a window management component that provides API functions tailored for the smaller display sizes typical of embedded operating systems.

The operating environment of various embodiments of the invention is event-driven. GWES module includes components to handle events, which in one embodiment of the invention are implemented as messages.

Communications module 216 includes a variety of communications component options to support communications hardware. This includes serial, parallel, and network (wired and wireless) communications. Communications module 216 includes the following selectable communications features:

Serial I/O support

Networking support including:
- NDIS 4.0 for local area networking
- PPP and SLIP for serial link and modem networking
- Client-side Remote Access Server (RAS)
- Internet protocols
- Telephony API (TAPI)
- PC Card support
- Infrared transceiver support In one embodiment of the invention, an embedded systems designer must develop the OEM adaptation layer 208 to create the platform specific kernel module 214. The OEM Adaptation Layer (OAL) module 208 allows an embedded system developer to adapt the operating system for a specific target platform by creating a thin layer of code that resides between the kernel module 214 and the target platform hardware 202. The OAL module 208 is specific for a particular CPU and target platform.

The OAL module 208 includes interfaces such as the following:
- Interrupt service routine (ISR) handlers to support device drivers
- Real-time clock (RTC)
- Interval timer (used for the scheduler operation)

In one embodiment of the invention, the RTC and interval timer does not need to be adapted because it is provided on the CPU. In this case, these interfaces are implemented in the kernel module 214 rather than in the: OAL 208.

In addition to managing such functions as timing and power, the primary purpose of the OAL is to expose the target platform's hardware 202 to the kernel module 214. That is, each hardware interrupt request line (IRQ) is associated with one interrupt service routine (ISR). When interrupts are enabled and an interrupt occurs, the kernel calls the registered ISR for that interrupt.

Built in drivers 206 are device drivers that are linked with GWES module 212 when building the operating system. Examples of such drivers are the notification LED driver or the battery driver. These drivers are called "built-in device drivers" because they ultimately form part of the same executable image as the rest of the operating system. Built-in device drivers each have a custom interface to the rest of operating system.

Device Manager module 210 is a module that handles installable device drivers. In one embodiment of the invention, The Device Manager 210 performs the following tasks:
- Initiates the loading of a driver at system start up, or when it receives a notification that a third-party peripheral has been attached to the target platform. For example, when a PC Card is inserted, Device Manager 210 will attempt to locate and load a device driver for that PC Card.
- Registers special filesystem entries with the kernel that map the Stream I/O Interface functions used by applications to the implementation of those functions in an installable device driver.
- Finds the appropriate device driver by obtaining a Plug and Play ID or by invoking a detection routine to find a driver that can handle the device.
- Loads and tracks drivers by reading and writing registry values.
- Unloads drivers when their devices are no longer needed. For example, Device Manager 210 will unload a PC Card device driver when the card is removed.

In one embodiment of the invention, Installable Device Drivers 204 exist as standalone DLLs (Dynamic Link Library) that are managed by the Device Manager 210. Installable device drivers 204 support some types of native devices, any peripheral devices that can be connected to the target platform, and any special purpose devices that are added to the platform. This covers devices such as modems, printers, digital cameras, PC Cards (also known as PCMCIA cards), and others.

In one embodiment of the invention; installable device drivers 204 use a common interface by which their services are exposed to applications. This interface is the Stream I/O Interface.

Figure 2:
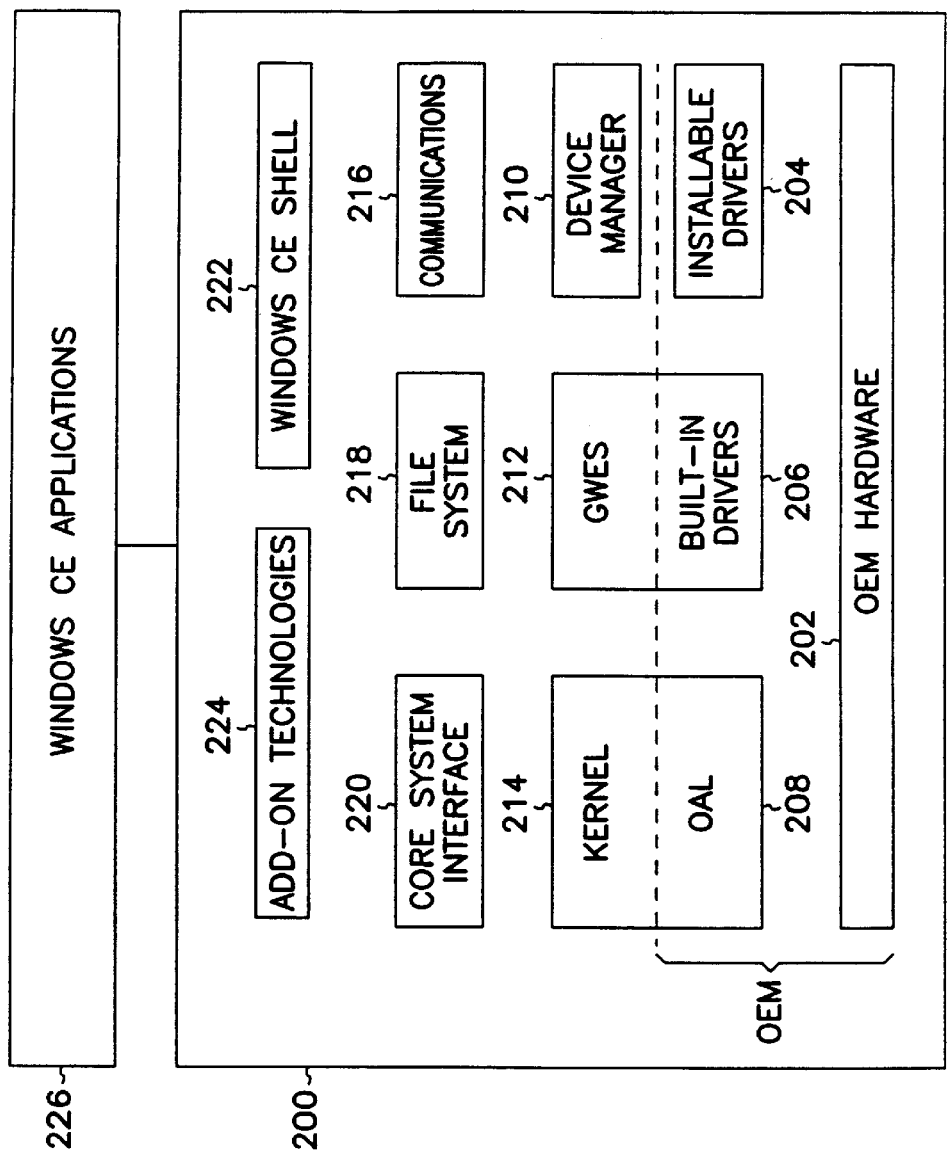
FIG. 2 is a diagram illustrating a system-level overview of exemplary embodiments of an operating system for a resource limited environment.
Figure 3:
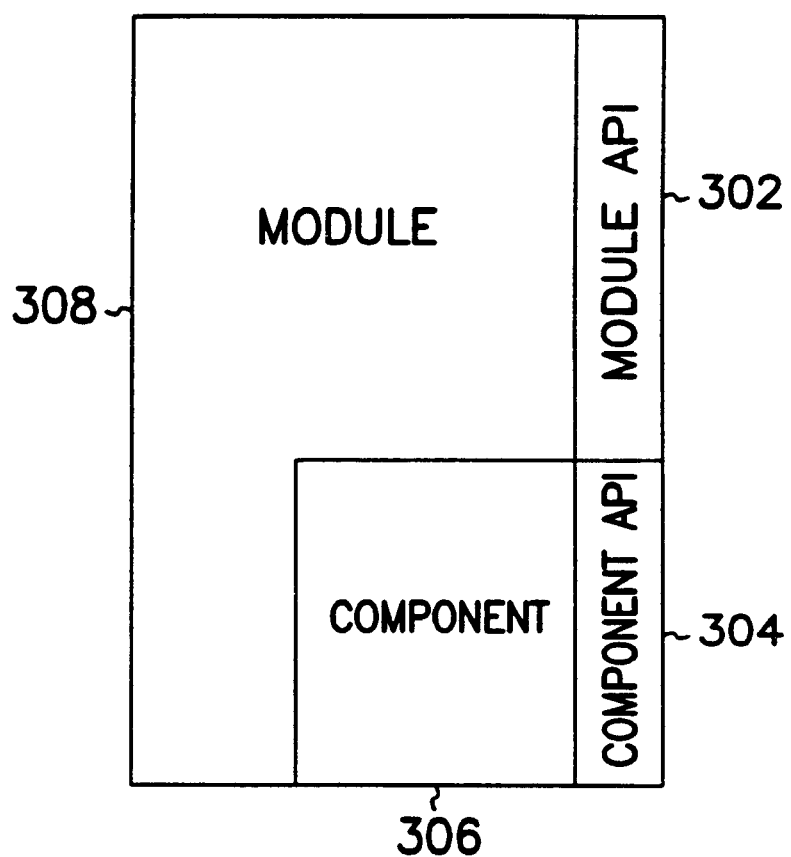
FIG. 3 is a diagram further illustrating the relationship of modules, components and APIs according to an embodiment of the invention.

A description of the relationships between components, modules and the APIs they expose to applications is presented with reference to FIG. 3. A module 308 is a major functional block of an operating environment such as operating system 200 of FIG. 2. Module 308 exposes an API 302 to applications such as application 226 of FIG. 2 that allows the application to interface and call methods or functions implemented by the module 308.

Modules may optionally include one or more components 306. Components 306 are groups of functions and data that provide capabilities on a smaller scale than modules 308. Like a module 308, a component 306 also exposes an API 304 that other applications, modules, and components may use to call methods or functions implemented by the component 306.

As can be seen from the discussion above, the various embodiments of the invention provide advantages over prior systems. One benefit is that the operating system is modular. This allows an embedded system designer to create an operating environment that is optimized for their unique hardware development platform and application. The developer can select varying combinations of the above-described modules and components for inclusion in the operating environment. For example, a developer can build an embedded operating system that contains the kernel and a selected set of communications but does not provide a graphical user interface. Thus, the invention is not limited to any particular combination of modules and components.

The various embodiments of the invention also provides a mechanism for developers to conserve the limited memory resources of a typical embedded system, because only those modules and components having APIs that are necessary for the operating environment need be included.

APIs in a Resource Limited System

The previous section presented a system level overview of modules and components included in a typical operating system for a system with limited resources. This section, along with the attached appendices, present novel APIs and data structures related to the modules and components described above. The APIs detailed below and in the attached appendices are described in terms of the C/C++ programming language. However, the invention is not so limited, and the APIs may be defined and implemented in any programming language, as those of skill in the art will recognize. Furthermore, the names given to the API functions and parameters are meant to be descriptive of their function, however other names or identifiers could be associated with the functions and parameters, as will be apparent to those of skill in the art. Six sets of APIs and data structures will be presented: Handwriting Recognition APIs, Position and Navigation APIs, Speech related APIs, Out of Memory APIs, Database APIs and Active Synch Data Structures.

1. Handwriting Recognition APIs

A handwriting recognition component is available in the Add-On Technologies module 224 (FIG. 2). The handwriting recognition component implements a handwriting recognition engine. In one embodiment of the invention, the engine receives "ink" in the form of a plurality of strokes on a touch sensitive screen. The strokes are then sent from applications to the engine using a variety of APIs. The engine then attempts to interpret the strokes as alphanumeric characters. The interpreted characters are returned to the application via an API. In one embodiment of the invention, the characters are interpreted as English language characters. In alternative embodiments of the invention, the characters are interpreted in other languages.

The handwriting recognition component is particularly useful in embedded systems that have a touch sensitive display, but no keyboard. Applications that require alphanumeric input can use the characters received from the engine as if they had been typed at a keyboard.

Further details on the APIs used by applications that interface with a handwriting recognition engine are presented as a computer program listing on computer disc in Appendix G.

2. Position and Navigation APIs and Data Structures

A Position and Navigation component is available in the Add-On Technologies module. The Position and Navigation component allows an application to interface with a positioning device (also referred to as a positioning and navigation device) such as an Apollo GPS system. Such an interface is useful when the embedded system is located in a mobile article such as an automobile or truck. In one embodiment of the invention, the embedded system is the AutoPC.

Further details on the APIs for the Position and Navigation module are found as a computer program listing on computer disc in Appendix E. Also, further details on data structures used by the Position and Navigation Module and related APIs are found as a computer program listing on computer disc in Appendix F.

3. Speech Related APIs

The Add-On Technologies module contains several speech-related components that expose APIs for application use. These components include a text-to-speech component, a voice-to-text component, and a voice command component. In general, these components are intended for environments where input and output devices are limited, and where a user's interaction with the embedded system is via speech. An example of such an environment is the AutoPC. Because the driver must use his hands in the operation of the automobile, interaction with the AutoPC is via a speech interface, where input commands are spoken by the user, and output from the PC is converted from text to speech.

Further details on the text-to-speech APIs are presented as a computer program listing on computer disc in the Appendix H. Further details on the voice command and speech to text APIs are presented as a computer program listing on computer disc in Appendices I, J and K.

4. Out of Memory API

The Out of Memory API is a component of the GWES module. This component allows an embedded system developer to replace the default action that occurs when the operating system detects that the system is running out of available memory in which to run applications or place data.

The Out of Memory component is significant to an operating system intended for limited resource environments, because the condition is more likely to occur in an embedded system than in a desk-top system. The API exposed provides a standardized way for the operating system to call customized software that meets the specific needs of an embedded system developer.

Further details on the out of memory API are presented as a computer program listing on computer disc in Appendix L.

5. Database API

As discussed above in the reference to FIG. 2, the file system module 218 may optionally include a database component. The database component allows applications to create and maintain databases as file system objects. Applications make calls to various API functions that maintain the database. These functions include functions that create new databases, open existing databases, delete databases, seeks particular records in databases, read records from databases and write records to databases. In addition, the Database API includes functions that navigate through a list of databases of a given type. Further details regarding the Database API are presented as a computer program listing on computer disc in Appendix C.

6. ActiveSync Data Structures

ActiveSync is a component available in the Add-On Technologies module. The ActiveSync component provides a service that allows applications to compare two objects to determine if one of the objects needs to be updated in order for the objects to be "synchronized", that is, the same. Typically the objects are file system objects containing application data. ActiveSync is particularly useful when applied to hand-held PCs. This is because the user often will update data maintained in a file system object on the hand-held PC, and then need to update a file on a desk-top PC so that the two files contain the same data. For example, hand-held PCs typically provide an application such as a Personal Information Manager that maintains a database of information, including telephone numbers. If a user maintains a similar database of telephone numbers on both their hand-held PC and their desk-top PC, it is desirable that the two telephone directories reflect updates made to either the hand-held PC or desk-top PC database. ActiveSync allows a user to accomplish this.

In one embodiment of the invention, several data structures are employed that enable ActiveSync to correctly compare and perform updates to corresponding objects. The first data structure is the CONFINFO data structure. The data structure is used to retrieve information about two potentially conflicting items. In one embodiment of the invention, an ActiveSync Server presents the information in the CONFINFO data structure to a user via a dialogue box to allow the user to choose an option for resolving the conflict. Further details regarding the CONFINFO data structure are presented as a computer program listing on computer disc in Appendix A.

A second data structure used by the Active Synch component is the OBJNOTIFY structure. The OBJNOTIFY data structure is used to notify the ActiveSync service provider that an object in the file system has changed or been deleted. Further details regarding the OBJNOTIFY data structure are presented in Appendix A.

Conclusion

APIs for modules and components of a resource-limited operating system have been described. The APIs provide access to specialized hardware and software that is desirable in such limited-resource systems.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

For example, those of ordinary skill within the art will appreciate that while the embodiments of the invention have been described as being implemented in a resource-limited environment, the principles of the invention are applicable to other environments. For example, the voice command APIs can be adapted to standard desk-top operating system to aid user's who have difficulty using a conventional keyboard and mouse to provide input to a system.

Furthermore, while some examples in the detailed description above are discussed in terms of the Windows CE operating system, the systems, methods and APIs of the invention may be applied to any operating system.

The terminology used in this application is meant to include all of these environments. Therefore, it is manifestly intended that this invention be limited only by the following claims and equivalents thereof.

We claim:

1. In an embedded system that includes limited memory resources and a number of user modules that may be executed to become active, wherein an active user module consumes a portion of the limited memory resources, and wherein the user modules may potentially consume more memory than is available in the limited memory resources, a method for replacing a default operating system response to available memory resources dropping below a specified threshold, the method comprising the acts of:
   receiving a function call, via a common interface, from a component that monitors system memory, the function call requesting a response to available memory resources dropping below the specified threshold;
   presenting information associated with memory resources at a user interface; and
   causing at least one active user module currently consuming a portion of memory resources to release the portion of memory resources.

2. The method as recited in claim 1, wherein the act of receiving a function call comprises an act of receiving a function call via an application program interface.

3. The method as recited in claim 1, wherein the act of receiving a function call comprises an act of receiving a function call requesting that a user module be deactivated.

4. The method as recited in claim 1, wherein the act of receiving a function call comprises an act of receiving a function call requesting information associated with the limited memory resources be collected.

5. The method as recited in claim 1, wherein the act of receiving a function call comprises an act of receiving a function call requesting that a descriptive message associated with the limited memory resources be presented at a user-interface.

6. The method as recited in claim 1, wherein the act of presenting information associated with memory resources at a user-interface comprises an act of presenting a window that contains information associated with the limited memory resources.

7. The method as recited in claim 1, wherein the act of presenting a window that contains information associated with the limited memory resources comprises an act of resenting a window that contains available options for releasing portions of the limited memory resources that are currently being consumed.

8. The method as recited in claim 1, wherein the act of presenting a window that contains information associated with the limited memory resources comprises an act of presenting a window that provides an indication that memory is below the specified threshold.

9. The method as recited in claim 1, wherein the act of presenting a window that contains information associated with the limited memory resources comprises an act of presenting a window that provides an indication that a user module is not responding.

10. The method as recited in claim 1, wherein the act of causing at least one active user module currently consuming a portion of memory resources to release the portion of memory resources comprises an act of deactivating a user module.

11. The method as recited in claim 1, wherein the act of causing at least one active user module currently consuming a portion of memory resources to release the portion of memory resources comprises an act of causing an active user module to release memory resources being consumed to store data associated with the active user module.

12. In an embedded system that includes limited memory resources, a method for customizing embedded system behavior when there is a reduction in available memory resources, the method comprising the acts of:
   receiving an initialization function call, via a common initialization interface, the function call requesting that a memory monitoring component be initialized to perform one or more of a plurality of memory functions;
   detecting a reduction in available memory resources; and
   receiving a memory function call, via a common interface, requesting that one of the one or more initialized memory functions be performed.

13. The method as recited in claim 12, wherein the act of receiving an initialization function call requesting that a memory monitoring component be initialized to perform one or more of a plurality of memory functions comprises an act of receiving an initialization function call requesting that a memory monitoring component be initialized to indicate when a user module is not responding.

14. The method as recited in claim 12, wherein the act of receiving an initialization function call requesting that a memory monitoring component be initialized to perform one or more of a plurality of memory functions comprises an act of receiving an initialization function call requesting that a memory monitoring component be initialized to determine memory resource information that should be presented at a user-interface.

15. The method as recited in claim 12, wherein the act of receiving an initialization function call requesting that a memory monitoring component be initialized to determine memory resource information that should be presented at a user interface comprises an act of receiving an initialization function call requesting that a memory monitoring component be initialized to determine when a message indicating that memory resources are below a specified threshold should be presented at the user-interface.

16. The method as recited in claim 12, wherein the act of receiving an initialization function call requesting that a memory monitoring component be initialized to perform one or more of a plurality of memory functions comprises an act of receiving an initialization function call requesting that a memory monitoring component be initialized to collect information associated with the limited memory resources of the embedded system.

17. The method as recited in claim 12, wherein the act of receiving an initialization function call requesting that a memory monitoring component be initialized to perform one or more of a plurality of memory functions comprises an act of receiving an initialization function call requesting that a memory monitoring component be initialized to send a message to active user modules when memory resources drop below a specified threshold.

18. The method as recited in claim 12, wherein the act of receiving an initialization function call requesting that a memory monitoring component be initialized to perform one or more of a plurality of memory—functions comprises an act of receiving an initialization function call requesting that a memory monitoring component be initialized to release memory being consumed by one or more active user modules when memory resources drop below a specified threshold.

19. A computer program product for use in an embedded system that includes limited memory resources and a number of user modules that may be executed to become active, wherein an active user module consumes a portion of the limited memory resources, and wherein the user modules may potentially consume more memory resources than are available in the limited memory resources, the computer program product for implementing a method for replacing a default operating system response when available memory resources drop below a specified threshold the computer program product comprising the following:

one or more computer-readable media carrying computer-executable instruction, that when executed at the embedded system, cause the embedded system to perform the method, including:

receiving a function call, via a common interface, from a component that monitors system memory, the function call requesting a response to available memory resources dropping below the specified threshold, presenting memory usage information at a user interface; and causing at least one active user module currently consuming a portion of memory resources to release the portion of memory resources.

20. A computer program product for use in an embedded system that includes limited memory resources, the computer program product for implementing a method for customizing embedded system behavior when there is a reduction in available memory resources, the computer program product comprising:

one or more computer-readable media carrying computer-executable instructions, that when executed at the computer system, cause the computer system to perform the method, including:

initializing a memory monitoring component to perform one or more of a plurality of memory functions, where each memory function may be called via a common interface;

detecting a reduction in available memory resources; and receiving a request, via the common interface for a memory function that is one of the one of more initialized memory functions, to perform the memory function.

* * * * *

UNITED STATES PATENT AND TRADEMARK OFFICE
CERTIFICATE OF CORRECTION

PATENT NO. : 6,832,381 B1  Page 1 of 1
APPLICATION NO. : 09/560546
DATED : December 14, 2004
INVENTOR(S) : Mathur et al.

It is certified that error appears in the above-identified patent and that said Letters Patent is hereby corrected as shown below:

In column 1, line 56, after "the" delete ":".

In column 1, line 59, after "facility." delete "Similarly,".

In column 9, line 28, after "the" delete ":".

In column 10, line 8, after "invention" delete ";" and insert -- , --, therefor.

In column 12, line 38, after "structure." delete "The" and insert -- This --, therefor.

In column 14, line 43, in Claim 15, delete "user interface" and insert -- user-interface --, therefor.

In column 14, line 67, in Claim 18, delete "memory-functions" and insert -- memory functions --, therefor.

In column 15, line 18, in Claim 19, delete "instruction" and insert -- instructions --, therefor.

In column 15, line 25, in Claim 19, after "threshold" delete "," and insert -- ; --, therefor.

Signed and Sealed this

Thirty-first Day of March, 2009

JOHN DOLL
*Acting Director of the United States Patent and Trademark Office*